(12) United States Patent
Faulhaber et al.

(10) Patent No.: US 12,552,703 B2
(45) Date of Patent: Feb. 17, 2026

(54) METHODS FOR OPTIMIZING GRADED INDEX FIBER LENGTH TO IMPROVE IMAGE QUALITY

(71) Applicant: Lumentum Operations LLC, San Jose, CA (US)

(72) Inventors: Richard D. Faulhaber, San Carlos, CA (US); Patrick Gregg, Sunnyvale, CA (US); Martin H. Muendel, Oakland, CA (US)

(73) Assignee: Lumentum Operations LLC, San Jose, CA (US)

( * ) Notice: Subject to any disclaimer, the term of this patent is extended or adjusted under 35 U.S.C. 154(b) by 280 days.

(21) Appl. No.: 18/353,414

(22) Filed: Jul. 17, 2023

(65) Prior Publication Data
US 2024/0368021 A1 Nov. 7, 2024

Related U.S. Application Data

(60) Provisional application No. 63/499,635, filed on May 2, 2023.

(51) Int. Cl.
*C03B 37/14* (2006.01)
*C03B 37/15* (2006.01)
(Continued)

(52) U.S. Cl.
CPC ............ *C03B 37/14* (2013.01); *C03B 37/15* (2013.01); *G02B 6/0288* (2013.01); *G02B 6/2552* (2013.01); *G02B 6/268* (2013.01); *G02B 6/2848* (2013.01); *C03B 2203/40* (2013.01); *G02B 6/262* (2013.01)

(58) Field of Classification Search
CPC .... G02B 6/0288; G02B 6/2552; G02B 6/262; G02B 6/268; G02B 6/2848; C03B 37/14; C03B 2203/40
See application file for complete search history.

(56) References Cited

U.S. PATENT DOCUMENTS

| 9,250,390 B2 * | 2/2016 | Muendel ............. G02B 6/4216 |
| 11,360,269 B2 * | 6/2022 | Faulhaber ............ G02B 6/4296 |

(Continued)

OTHER PUBLICATIONS

Analysis of the use of tapered graded-index polymer optical fibers for refractive-index sensors, Optics Express, vol. 16, No. 21, pp. 16616-16631, Oct. 13, 2008 (Year: 2008).*

(Continued)

*Primary Examiner* — Uyen Chau N Le
*Assistant Examiner* — Darby M. Thomason
(74) *Attorney, Agent, or Firm* — Harrity & Harrity, LLP

(57) ABSTRACT

In some implementations, a fiber processing machine may receive an optical assembly comprising an input fiber, an output fiber, and a graded index fiber spliced between the input fiber and the output fiber, wherein the graded index fiber has a pitch length and a processed length. A light source may deliver input light into an input end of the input fiber while one or more components monitor output light at an output end of the output fiber. The fiber processing machine may alter a core diameter and the processed length of the graded index fiber until one or more measurements of the output light at the output end of the output fiber indicate that the output light is a perfect image of the input light.

20 Claims, 10 Drawing Sheets

(51) Int. Cl.
 *G02B 6/028* (2006.01)
 *G02B 6/255* (2006.01)
 *G02B 6/26* (2006.01)
 *G02B 6/28* (2006.01)

(56) References Cited

U.S. PATENT DOCUMENTS

| | | | | |
|---|---|---|---|---|
| 2003/0133654 A1* | 7/2003 | Chang | ............... | G02B 6/32 |
| | | | | 385/124 |
| 2005/0265653 A1* | 12/2005 | Cai | ............... | G02B 6/2552 |
| | | | | 385/28 |
| 2017/0017036 A1* | 1/2017 | Botheroyd | ........... | G02B 6/2856 |
| | | | | 385/24 |
| 2019/0094469 A1* | 3/2019 | Mouri | ............... | G02B 27/0994 |

OTHER PUBLICATIONS

Robust Mode Matching between Structurally Dissimilar Optical Fiber Waveguides, ACS Photonics, vol. 8, pp. 857-863, 2021 (Year: 2021).*

* cited by examiner

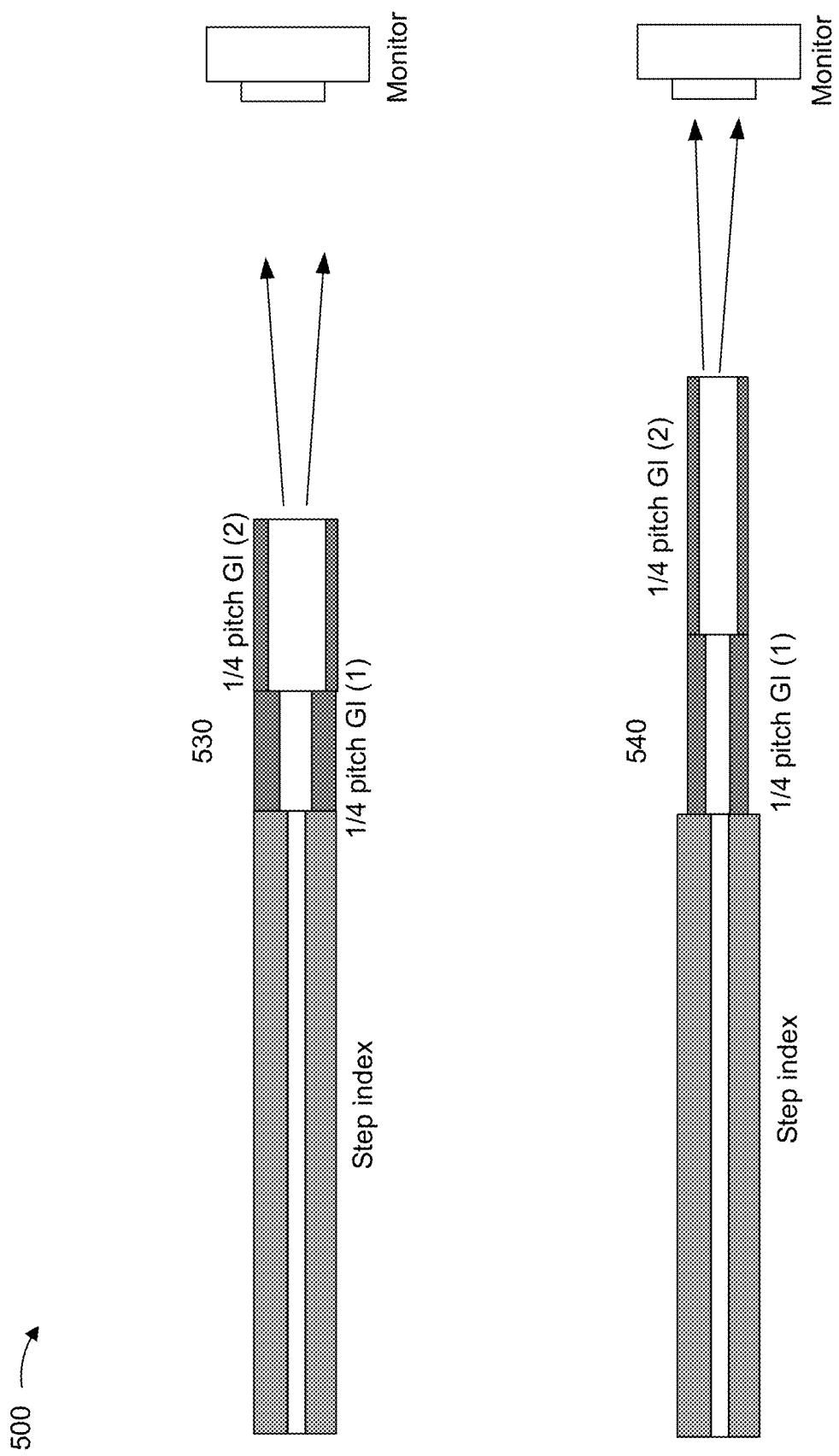

METHODS FOR OPTIMIZING GRADED INDEX FIBER LENGTH TO IMPROVE IMAGE QUALITY

CROSS-REFERENCE TO RELATED APPLICATION

This Patent Application claims priority to U.S. Provisional Patent Application No. 63/499,635, filed on May 2, 2023, and entitled "OPTIMIZING GRADED INDEX FIBER LENGTH." The disclosure of the prior Application is considered part of and is incorporated by reference into this Patent Application.

TECHNICAL FIELD

The present disclosure relates generally to graded index fibers, and to methods for optimizing a length of a graded index fiber based on a pitch length to improve image quality associated with a laser beam that travels through the graded index fiber.

BACKGROUND

Graded index fiber, also known as gradient index fiber or GRIN fiber, is a type of optical fiber that is designed to have a refractive index profile that gradually changes from the center of the fiber core to the outer cladding. The gradual change in refractive index profile is responsible for guiding and transmitting light signals through the graded index fiber. In a graded index fiber, the refractive index of the core is typically highest at a center, and the refractive index gradually decreases towards the cladding. This variation in refractive index, which is sometimes referred to as a refractive index gradient, creates a continuous change in a speed at which light propagates through the graded index fiber. Relative to other optical fibers, such as step index fibers, graded index fibers offer an ability to minimize modal dispersion that generally occurs when different modes or paths of light propagate at different speeds within a fiber, causing light pulses to spread and distort over long distances. The graded index profile helps to reduce modal dispersion by allowing the light to take different paths and arrive at the receiver simultaneously, resulting in a higher bandwidth and increased transmission capacity.

SUMMARY

In some implementations, a method for manufacturing a graded index fiber includes receiving an optical assembly comprising an input fiber, an output fiber, and a graded index fiber spliced between the input fiber and the output fiber, wherein the graded index fiber has a pitch length and a processed length; delivering input light into an input end of the input fiber; monitoring output light at an output end of the output fiber; and tapering the graded index fiber until one or more measurements of the output light at the output end of the output fiber indicate that the output light is a perfect image of the input light, wherein the processed length of the graded index fiber is N times the pitch length when the one or more measurements indicate that the output light is a perfect image of the input light, where N is an integer, a half-integer, or a quarter-integer.

In some implementations, a method for manufacturing a graded index fiber includes receiving an optical assembly comprising an input fiber, an output fiber, and a graded index fiber spliced between the input fiber and the output fiber, wherein the graded index fiber has a pitch length and a processed length; delivering input light into an input end of the input fiber; monitoring output light at an output end of the output fiber; and expanding a core diameter of the graded index fiber while shortening the processed length of the graded index fiber until one or more measurements of the output light at the output end of the output fiber indicate that the output light is a perfect image of the input light, wherein the processed length of the graded index fiber is N times the pitch length when the one or more measurements indicate that the output light is a perfect image of the input light, where N is an integer, a half-integer, or a quarter-integer.

In some implementations, a method for manufacturing a graded index fiber includes receiving an optical assembly comprising an input fiber, an output fiber, and a graded index fiber spliced between the input fiber and the output fiber, wherein the graded index fiber has a pitch length and a processed length; delivering input light into an input end of the input fiber; monitoring output light at an output end of the output fiber; and altering a core diameter and the processed length of the graded index fiber until one or more measurements of the output light at the output end of the output fiber indicate that the output light is a perfect image of the input light, wherein the processed length of the graded index fiber is N times the pitch length when the one or more measurements indicate that the output light is a perfect image of the input light, where N is an integer, a half-integer, or a quarter-integer.

BRIEF DESCRIPTION OF THE DRAWINGS

FIGS. 5A-5B are diagrams of example optical systems in which a length of a graded index fiber may be optimized based on a pitch length of the graded index fiber.

DETAILED DESCRIPTION

The following detailed description of example implementations refers to the accompanying drawings. The same reference numbers in different drawings may identify the same or similar elements.

Figure 1:
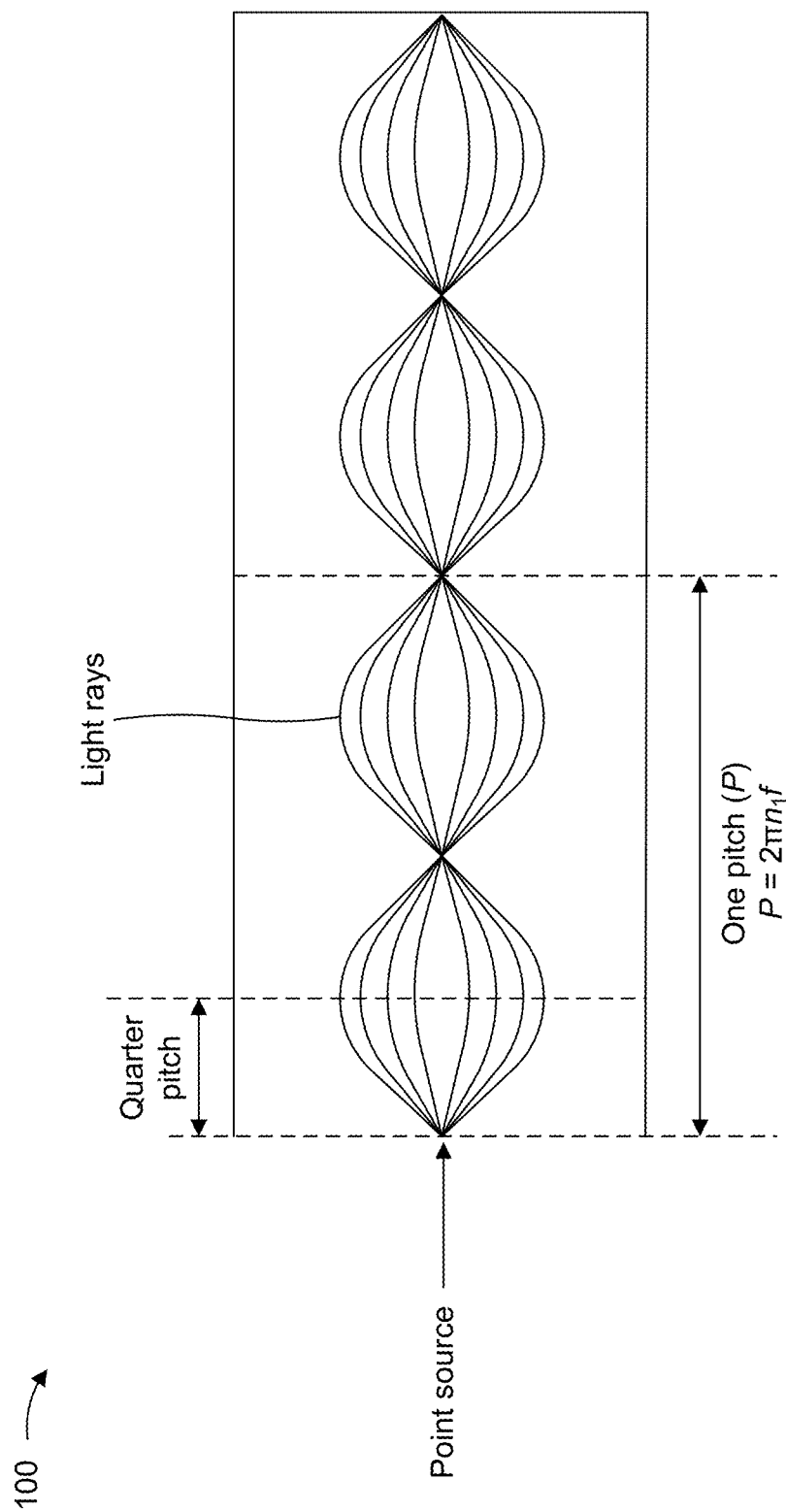
FIG. 1 is a diagram illustrating an example of a graded index fiber.

FIG. 1 is a diagram illustrating an example 100 of a graded index fiber. The graded index fiber has a refractive index profile, where a square of the refractive index profile may be parabolic or near-parabolic (e.g., in a core region). For example, the refractive index of the graded index fiber varies smoothly in a radial direction from an axis of the graded index fiber to a certain radial position. In other words, the graded index fiber has a refractive index profile that is parabolic or near-parabolic in cross-section, and uniform along a length of the graded index fiber. Accordingly, light rays that propagate through the graded index fiber follow a periodic trajectory through the parabolic or near-parabolic refractive index profile of the graded index fiber. For example, as shown in FIG. 1, one or more light rays that originate from a point source (e.g., a laser source and/or an input fiber coupled to a laser source, among other examples) may propagate through the graded index fiber. Due to periodic imaging properties of the graded index fiber, the point source is exactly reimaged every pitch (and imaged but inverted every half-pitch). Mathematically, the light rays traveling through a single pitch of the graded index fiber are calculated as four successive Fourier transforms, representing collimation (e.g., in a first quarter-pitch), focusing to an inverted image (e.g., in a second quarter-pitch), collimation (e.g., in a third quarter-pitch), and focusing again (e.g., in a fourth quarter-pitch). In some implementations, the pitch of the graded index fiber is determined by a core diameter and a numerical aperture when the graded index fiber is drawn.

Accordingly, as described herein, a graded index fiber has a useful reimaging property in which an incident light field is periodically recreated along a length of the graded index fiber. The reimaging property of a graded index fiber is analogous to the light field being repeatedly collimated and focused by a series of lenses. The characteristic length for reimaging is referred to as a pitch length, or a beat length. The reimaging property of graded index fibers has been widely used in various applications, such as creating graded index lenses. For example, in some applications, an exact quarter-pitch of a graded index fiber may be used to collimate or focus a laser beam into or out of an optical fiber. In another example, an exact quarter-pitch of a graded index fiber may be used to adjust a beam size between two fibers with different core diameters. The focal length, f, of such a lens is related only to the pitch of the graded index fiber, where the focal length is defined as follows:

$$f = \frac{a}{NA}$$

where a is a core radius and NA is a maximum numerical aperture of the graded index fiber. The focal length of a graded index fiber is typically in a range from approximately 100 micrometers (μm) to one millimeter (mm). Furthermore, as shown in FIG. 1, a length of one pitch, P, is generally defined as $2\pi n_1 f$, where f is the focal length of the graded index fiber and $n_1$ is a refractive index of a core of the graded index fiber.

As indicated above, FIG. 1 is provided as an example. Other examples may differ from what is described with regard to FIG. 1.

Figure 2A:
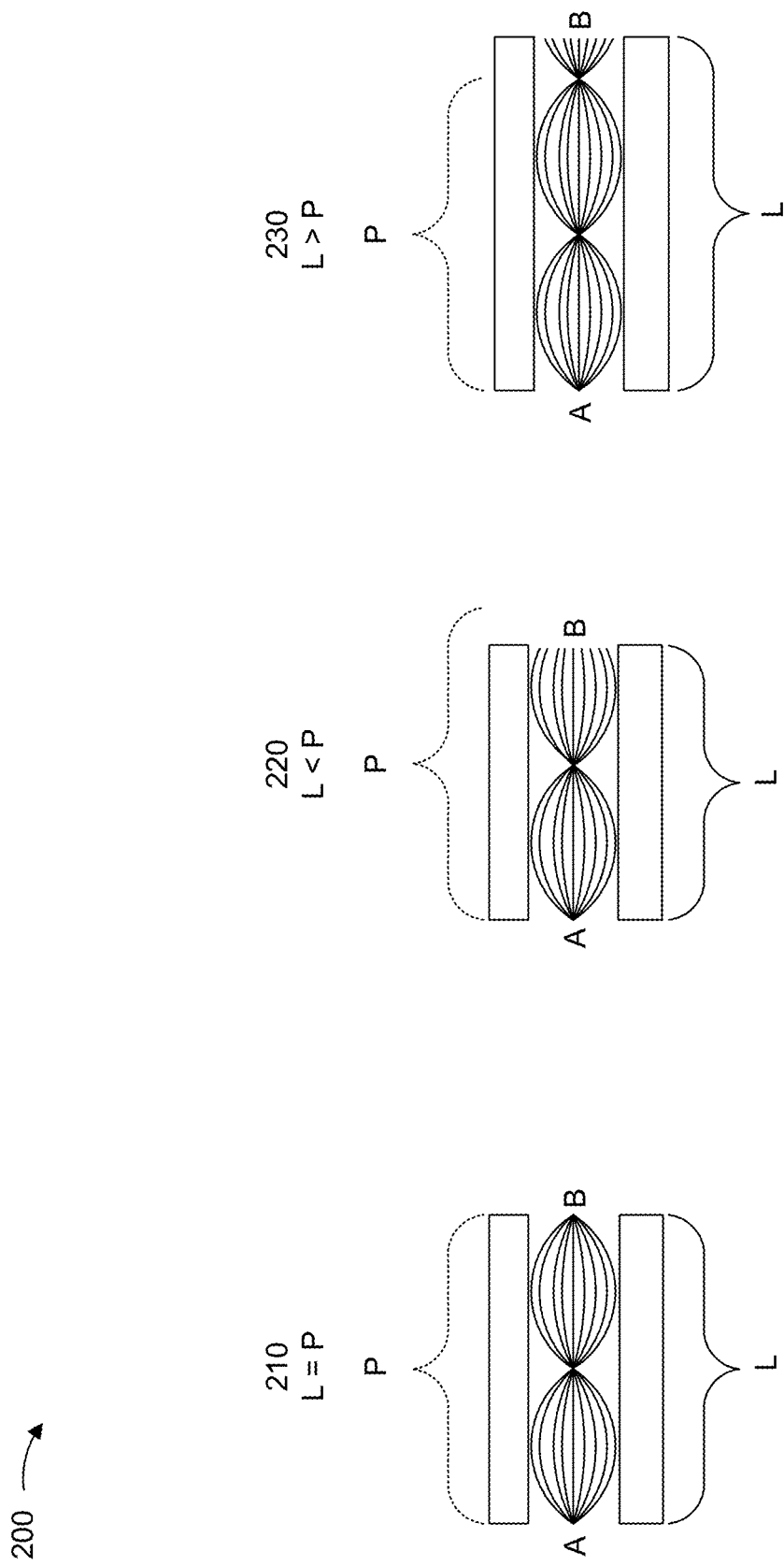
FIGS. 2A-2C are diagrams of graded index fiber segments in which a processed length of the graded index fiber may differ from a pitch length of the graded index fiber.
Figure 2B:
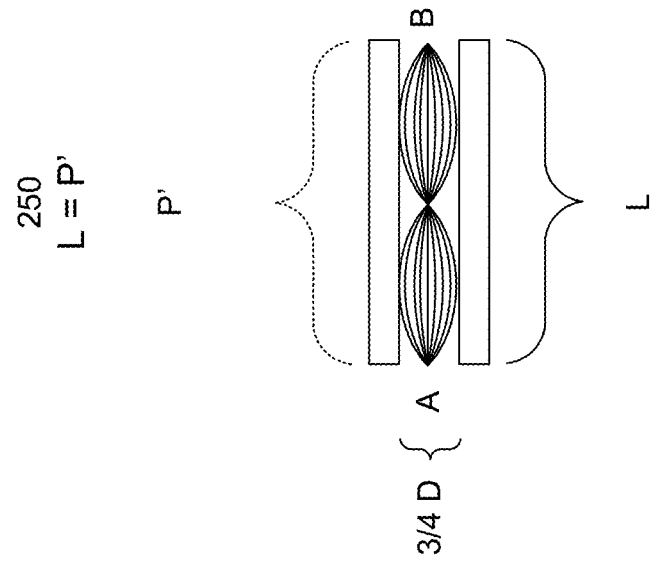
Figure 2B:
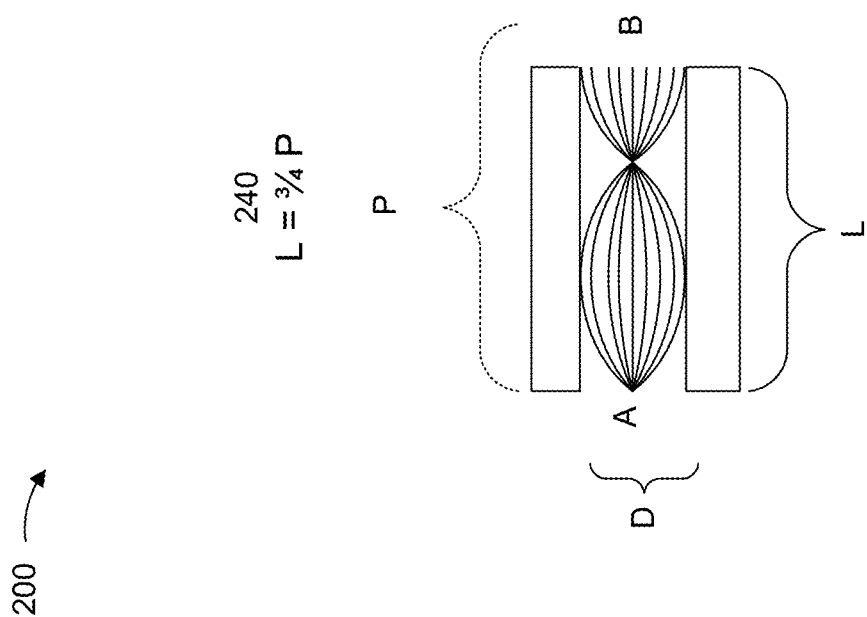
Figure 2C:
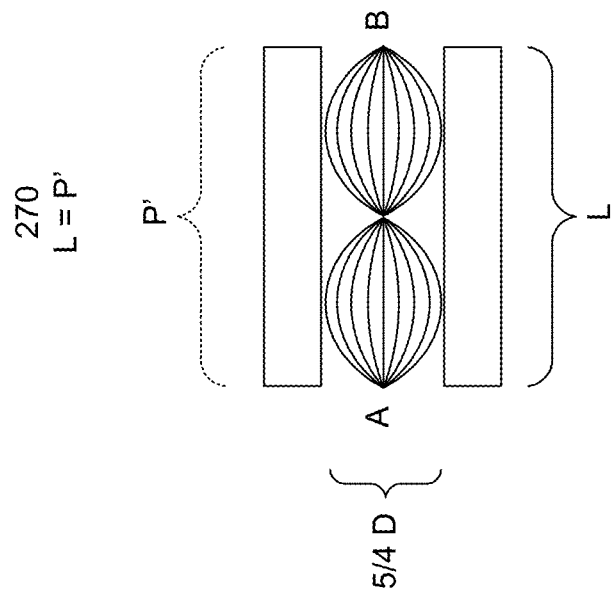
Figure 2C:
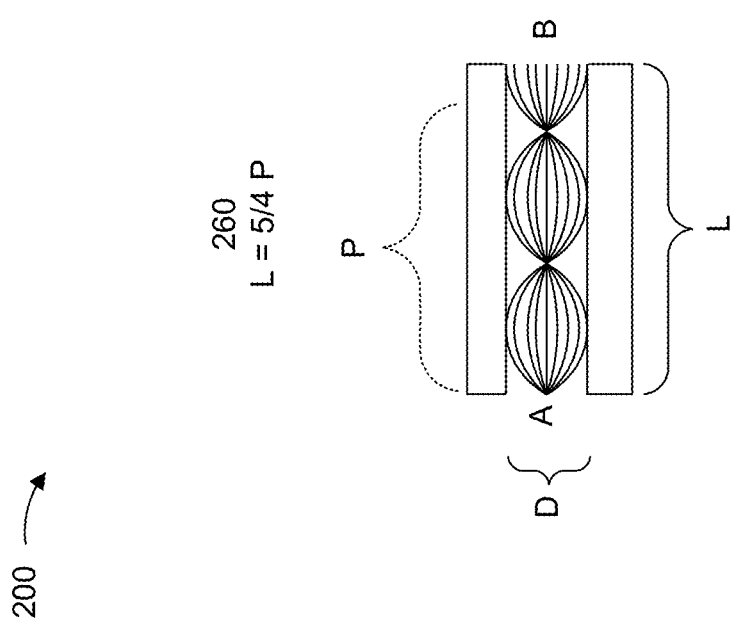

FIGS. 2A-2C illustrate examples 200 of graded index fiber segments in which a processed length, L, of the graded index fiber may differ from a pitch length, P, of the graded index fiber. As described herein, a graded index fiber has a reimaging property in which an incident light field is periodically recreated along a length of the graded index fiber, which has been widely used in various applications. For example, an exact quarter-pitch of a graded index fiber may be used to collimate or focus a laser beam into or out of an optical fiber and/or to adjust a beam size between two fibers with different core diameters. In another example, two quarter-pitch lengths of different graded index fibers can be used to make an in-fiber telescope. In another example, the reimaging property of a graded index fiber can be used to amplify a series of small perturbations in an active beam shaping system.

However, an assumption in all applications that aim to exploit the reimaging property of graded index fibers is that a graded index fiber with a precise length (e.g., one quarter-pitch, one half-pitch, one pitch, or N pitches, where N is an integer, a half-integer, or a quarter-integer) is practically achievable. In practice, however, a graded index fiber with a precise length is difficult or impossible to achieve reliably due to various challenges. For example, the pitch length of a graded index fiber is determined by one or more properties of the glass used to form the graded index fiber (e.g., a diameter, NA, and/or refractive index of the glass, among other examples). Furthermore, the processed length of the graded index fiber is typically determined by a fabrication or manufacturing process, such as cleaving or polishing. Moreover, fabricating a graded index fiber with a pristine end facet can be challenging because germanium (Ge) content is typically high, which induces stress in the graded index fiber and leads to hackle or uneven cleave surfaces. In such conditions, the graded index fiber may need to be polished to achieve an optical quality fiber facet. However, the amount of glass removed by one or more polishing processes can be difficult to control (e.g., due to wear on the polishing pads), leading to a length uncertainty of anywhere from tens of microns to a few hundred microns or more. Furthermore, in some cases, the pitch of the graded index fiber may not be known precisely (or may be unknowable), due to imprecision in the core diameter and/or the NA, which can lead to a large uncertainty, especially in cases where a graded index fiber has a length of multiple pitches. Further, imprecise knowledge of the fiber core and variation along the length of the graded index fiber can lead to uncertainty in the exact value of the focal length.

Accordingly, referring to FIG. 2A, reference number 210 illustrates a first (e.g., ideal) scenario, where a graded index fiber has a processed length that equals a pitch length (L=P), in which case light at point A is perfectly imaged at point B. However, in a second scenario shown by reference number 220, the practical considerations described above may result in a graded index fiber with a processed length that is less than the pitch length (L<P), in which case light at point A is not perfectly imaged at point B. Similarly, in a third scenario shown by reference number 230, a graded index fiber may have a processed length that is longer than the pitch length (L>P), in which case light at point A is again not perfectly imaged at point B. For example, reference number 240 in FIG. 2B illustrates an example where the processed length of the graded index fiber is less than the pitch length, which results in poor image quality. In a typical post-processing step, controllable parameters include a diameter of the graded index fiber core and the length of the graded index fiber. In the example shown by reference number 240, the processed length of the graded index fiber is three quarters of the pitch length (L=¾P). However, reference number 250 in FIG. 2B illustrates an example where the diameter of the graded index fiber, D, is reduced to ¾D and the pitch length maintained at the same value. In such cases, the new pitch length, P', would equal ¾P, and there would be perfect imaging at point B because L=P'. Similarly, reference number 260 in FIG. 2C illustrates an example where the processed length of the graded index fiber is longer than the pitch length, which also results in poor image quality. In the example shown by reference number 260, L=5/4×P. However, reference number 270 in FIG. 2C illustrates an example where the diameter of the graded index fiber, D, is increased to 5/4×D and the pitch length is maintained at the same value. In such cases, the new pitch length, P', would equal 5/4×P and there would be perfect imaging at point B because L=P'.

In practice, however, increasing or decreasing the diameter of a graded index fiber without altering the length of the graded index fiber is challenging. Accordingly, some implementations described in further detail herein relate to methods for optimizing a graded index fiber length through a well-controlled taper (e.g., independently increasing the length of the graded index fiber while reducing the diameter of the core of the graded index fiber). Additionally, or alternatively, some implementations described herein relate to methods for optimizing a graded index fiber length by independently expanding the diameter of the core of the graded index fiber while shortening the length of the graded index fiber. In this way, some implementations described herein may independently control the core diameter and the length of the graded index fiber, which may improve performance of any suitable application that depends on a graded index fiber having a specific length of N pitches, where N is an integer, a half-integer, or a quarter-integer.

As indicated above, FIGS. 2A-2C are provided as examples. Other examples may differ from what is described with regard to FIGS. 2A-2C.

Figure 3A:
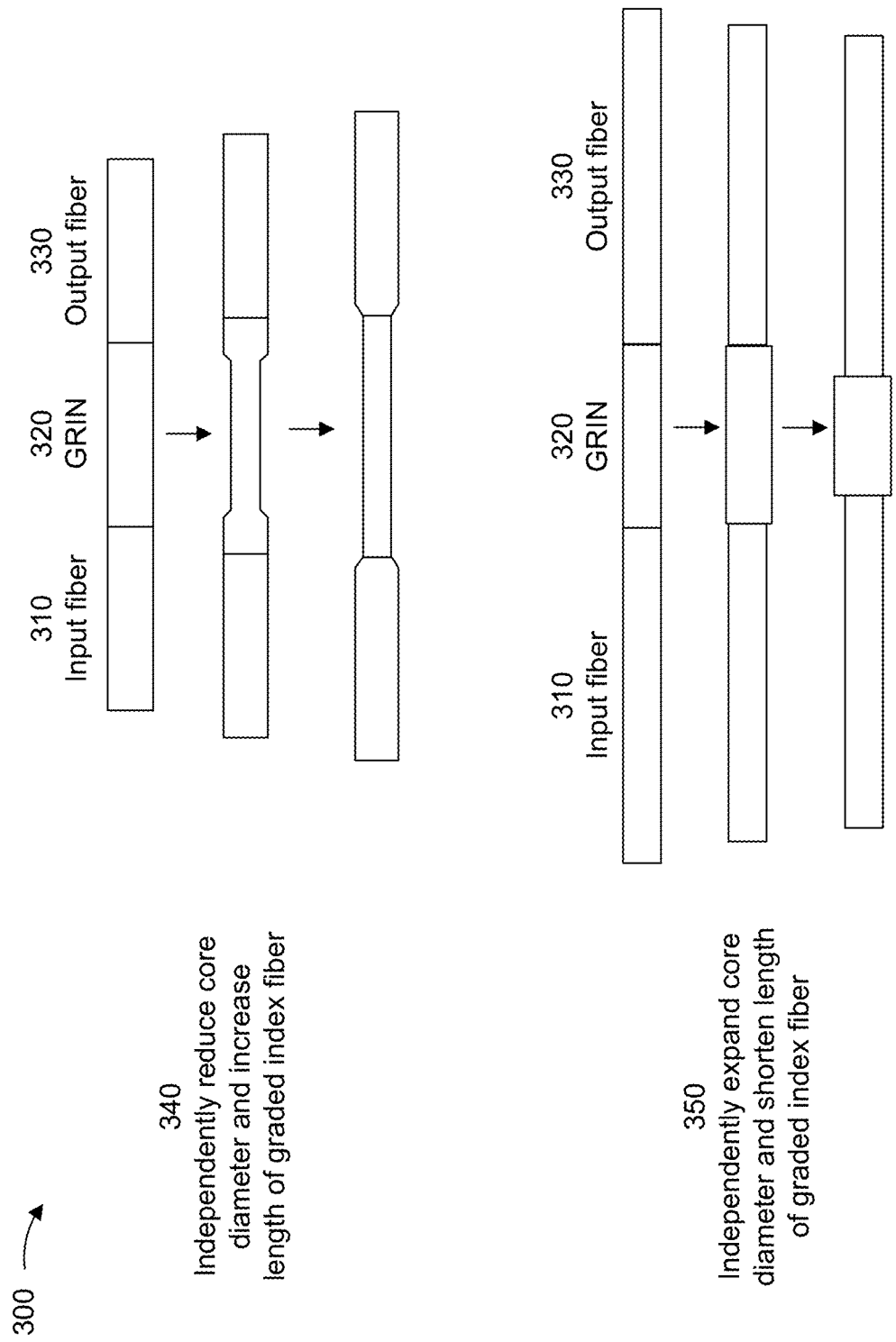
FIGS. 3A-3B are diagrams of example techniques to optimize a length of a graded index fiber based on a pitch length of the graded index fiber.
Figure 3B:
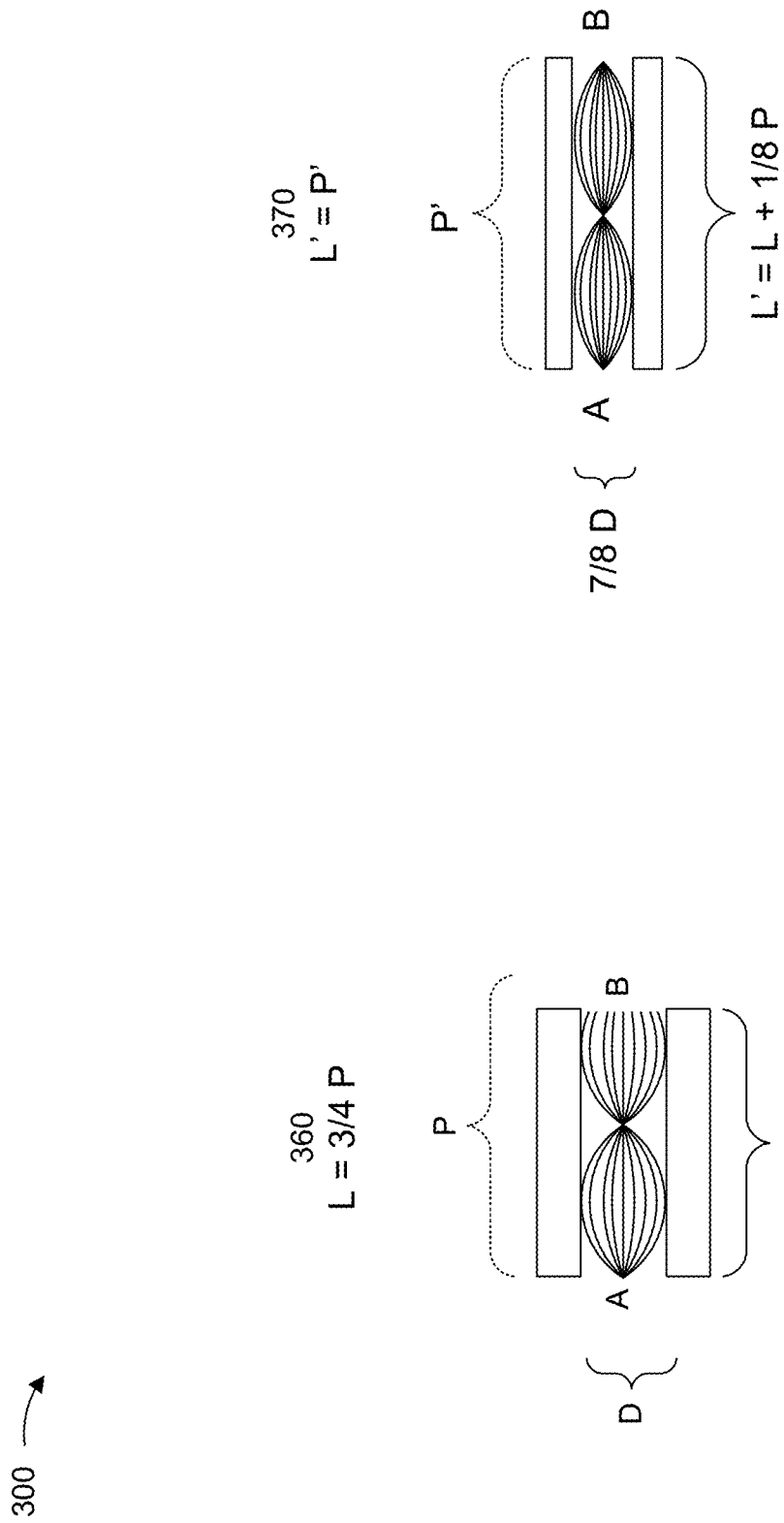

FIGS. 3A-3B illustrate examples 300 of methods for optimizing a graded index fiber length. For example, as shown in FIG. 3A, a graded index fiber 320 with a fixed length may be spliced between an input fiber 310 and an output fiber 330. As shown by reference number 340 in FIG. 3A, the graded index fiber 320 may then then be tapered to a desired length (e.g., in cases where the processed length of the graded index fiber exceeds a pitch length or a desired multiple of the pitch length associated with the graded index fiber 320). For optimum imaging to the output fiber 330, the graded index fiber 320 may need to have a length that corresponds to a fixed number of pitches. Otherwise, as described above with reference to FIGS. 2A-2C, the image quality would be negatively impacted if the processed length of the graded index fiber 320 differs from (e.g., is shorter or longer than) a fixed number of pitches. In some implementations, the output may be actively monitored (e.g., in a near field and/or a far field) while the graded index fiber 320 is tapered until the precise length is achieved for the graded index fiber 320.

In this way, a well-controlled taper can be performed to independently alter and precisely control both a diameter, D, and a length, L, of the graded index fiber 320. Accordingly, the taper may be used to change a combination of the diameter and the length of the graded index fiber to optimize image quality at point B. For example, reference number 340 illustrates an example where the graded index fiber 320 initially has a processed length that is shorter than the pitch length of the graded index fiber 320. Accordingly, as shown by reference number 340, one or more fiber tapering machines may hold the graded index fiber 320 in place while the graded index fiber 320 is translated over a heat source (e.g., a flame) while applying tension, which stretches the fiber and narrows the diameter of the heated section. In this way, the fiber tapering machine(s) can be used to taper one or more sections of the graded index fiber 320 (e.g., increasing the length while independently reducing the diameter of the graded index fiber 320) until a core-clad measurement or other suitable measurements indicate that output light from the graded index fiber 320 is a perfect image of input light delivered into the graded index fiber 320 (e.g., a measurement of the output light emitted from the core of the output fiber 330 satisfies a threshold, relative to a measurement of the output light emitted from the cladding of the output fiber 330). Additionally, or alternatively, reference number 350 depicts an example in which the graded index fiber 320 initially has a processed length that is longer than the pitch length of the graded index fiber 320. Accordingly, as shown by reference number 350, one or more fiber processing machines may hold the graded index fiber 320 in place while the graded index fiber 320 is processed in such a way that causes the core of the graded index fiber 320 to expand while shortening the length of the graded index fiber 320. In this way, the fiber processing machine(s) can be used to alter one or more properties of the graded index fiber 320 (e.g., increasing the length while independently reducing the diameter of the graded index fiber 320, or shortening the length while independently expanding the diameter of the graded index fiber 320) until a core-clad measurement or other suitable measurements indicate that output light from the graded index fiber 320 is a perfect image of input light delivered into the graded index fiber 320.

For example, reference number 360 in FIG. 3B illustrates an example where the processed length of the graded index fiber is three quarters of the pitch length (L=¾P) and the graded index fiber has a diameter, D (e.g., the processed length of the graded index fiber is shorter than the pitch length, such that the graded index fiber needs to be tapered to increase the length of the graded index fiber while reducing the diameter of the core of the graded index fiber to improve image quality). In some implementations, the method for optimizing the graded index fiber length to obtain optimum imaging may be subject to a constraint whereby L'=P', where L' and P' respectively represent the fiber length (or processed length) and the pitch length of the graded index fiber. As shown by reference number 370, starting from an initial structure in which L=¾P, the diameter may be reduced by ⅛ through a taper (e.g., compared to ¼ in the example shown in FIG. 2B), such that P'=⅞×P. In this case, to ensure that L'=P', the taper would need to increase the length of the graded index fiber by ⅛×P such that L'=L+⅛×P. Furthermore, it will be appreciated that similar techniques may be applied to independently expand the diameter and shorten the length of the graded index fiber.

As indicated above, FIGS. 3A-3B are provided as examples. Other examples may differ from what is described with regard to FIGS. 3A-3B.

Figure 4:
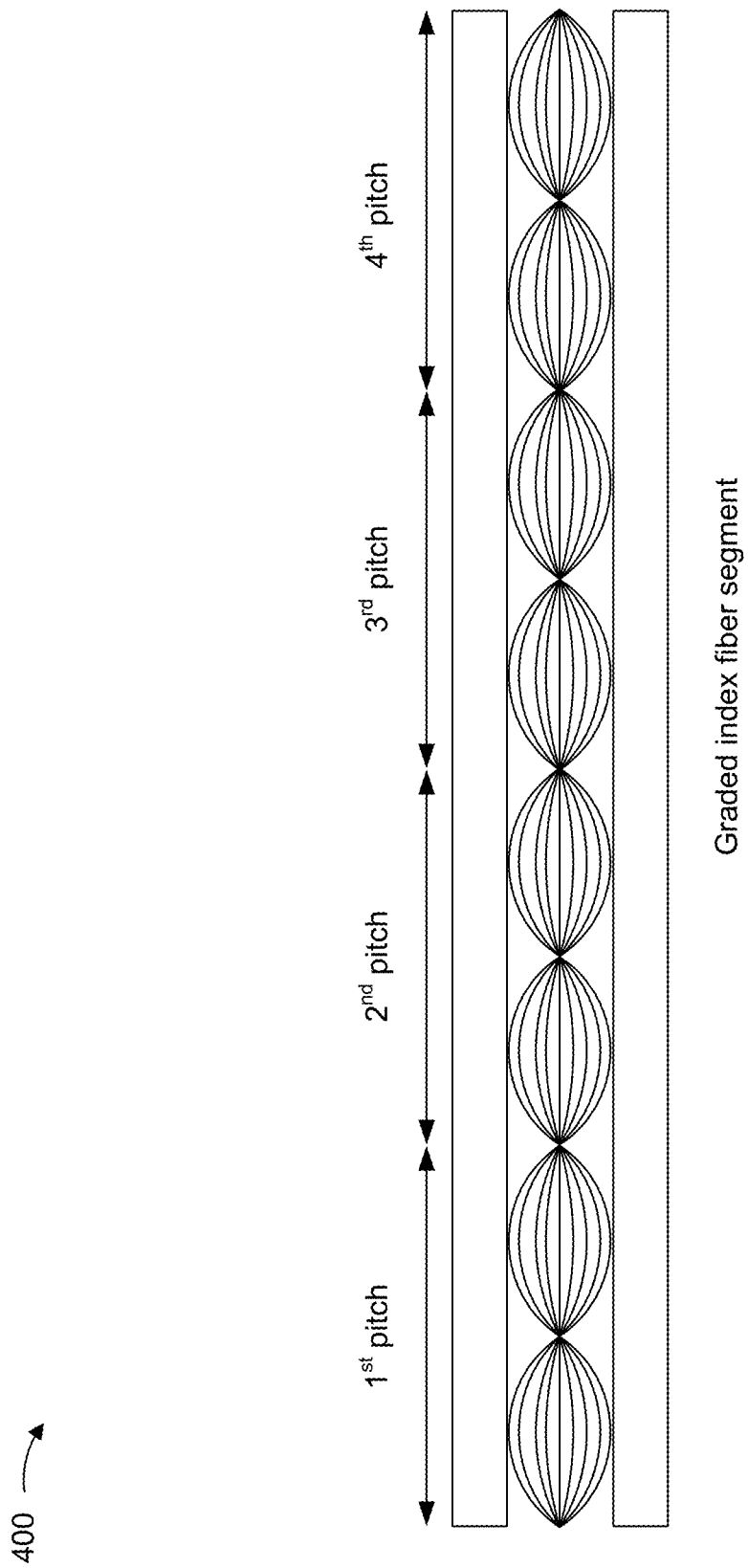
FIG. 4 is a diagram of an example graded index fiber segment with a length of multiple pitches.

FIG. 4 illustrates an example 400 of a graded index fiber segment that includes multiple pitches. For example, FIGS. 2A-2C and FIGS. 3A-3B describe techniques that can be used to optimize image quality in cases where the length of a graded index fiber segment is longer or shorter than a single pitch length. However, the same techniques can be generally applied to any suitable graded index fiber segment that includes n pitches (e.g., the graded index fiber segment shown in FIG. 4 includes four pitches, whereby n=4). In general, as the number of pitches in a graded index fiber segment increases, there is a corresponding increase in the error in image quality arising from the difference between the total length of the graded index fiber segment and n times the pitch length. Accordingly, in some implementations, the tapering or core-expanding techniques described above with respect to FIGS. 3A-3B may be suitably applied to optimize the length of a graded index fiber segment with n pitches (e.g., such that the total length equals n times the length of a single pitch, or L'=n×P').

As indicated above, FIG. 4 is provided as an example. Other examples may differ from what is described with regard to FIG. 4.

Figure 5A:
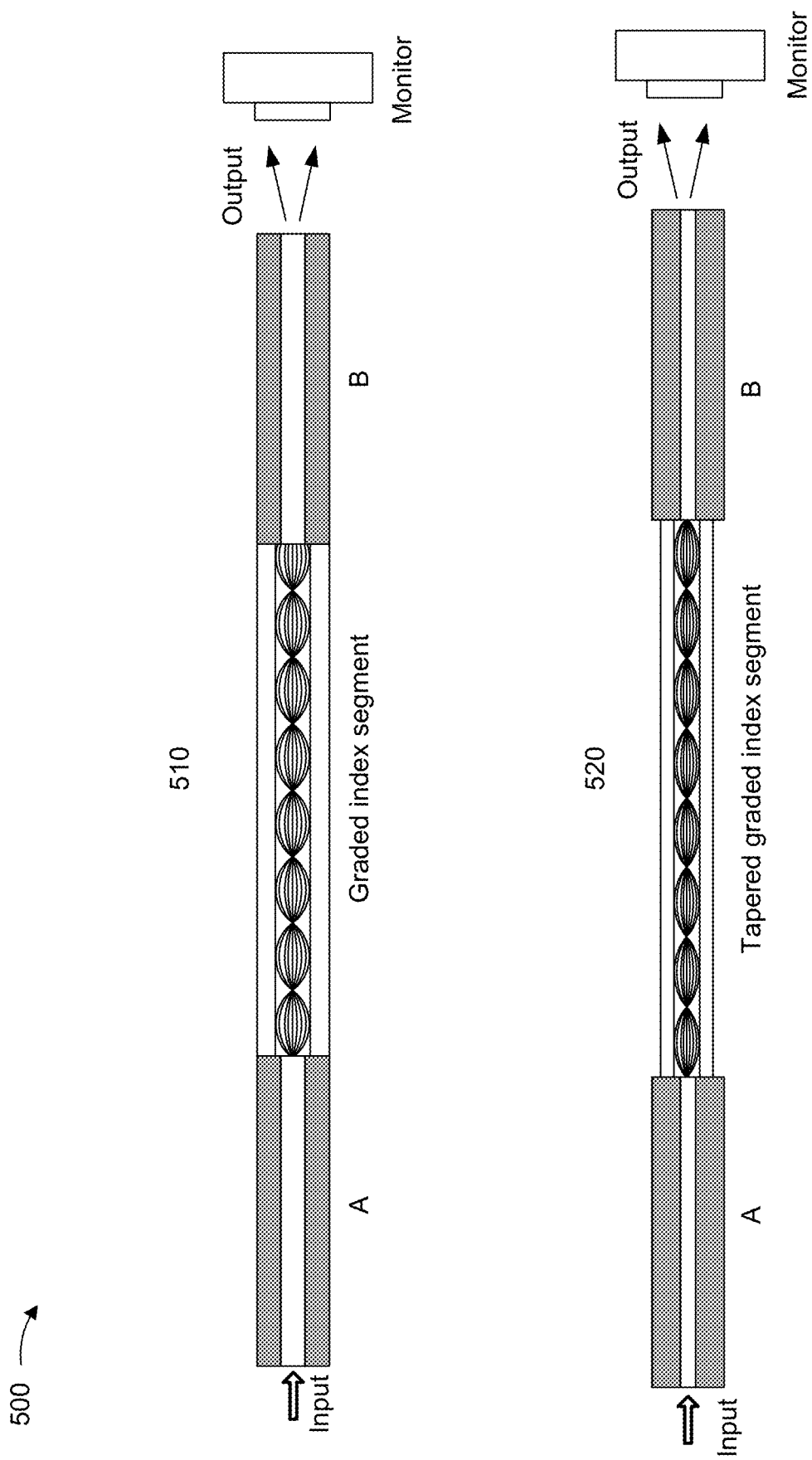

FIGS. 5A-5B illustrate examples 500 of optimizing the length of a grade index fiber that includes n pitches, where n is greater than one. For example, when a graded index fiber segment has a larger number of pitches (e.g., more than one pitch), the length of the graded index fiber segment becomes critical to maintaining image quality. For example, in a scenario where a graded index fiber segment is initially one pitch long and has a pitch length of 4 mm, an error of about 1% between L and P results in an error of about 40 µm. In this scenario, the image quality will not be perfect but may be tolerable for certain applications. However, if the pitch length is 4 mm and the graded index fiber segment is 10 pitches long, the image quality would be severely compromised because the 1% error between L and P results in an error of about 400 µm. In this scenario, to achieve the same image quality as a graded index fiber segment that is one pitch long, a 0.1% accuracy would be needed for the length of the graded index fiber, which is not viable or practical. Accordingly, in some implementations, an output from an optical assembly that includes a graded index fiber segment may be actively monitored while the graded index fiber segment is tapered until the optimum image quality is maintained (e.g., such that L'=n×P')

For example, reference number 510 in FIG. 5A illustrates an optical assembly in which a graded index fiber segment with n pitches is spliced between a first step index fiber (labeled A) and a second step index fiber (labeled B). In the illustrated example, the length of the graded index fiber is shorter than n×P, which leads to poor image quality at the output. Accordingly, as shown by reference number 520, the graded index fiber segment may be tapered (e.g., reducing the diameter and increasing the length of the graded index fiber), and the output of the optical assembly may be actively monitored while the graded index fiber segment is tapered until the optimum image quality is achieved. Additionally, or alternatively, reference number 530 in FIG. 5B illustrates a high-power all-fiber telescope in which the same principle can be applied to optimize image quality when magnifying or demagnifying with graded index fiber segments that have imperfect lengths (e.g., L≠n×P). For example, as shown by reference number 530, the high-power all-fiber telescope includes a first quarter pitch graded index fiber segment and a second quarter pitch graded index fiber segment coupled to a step index fiber. Accordingly, as shown by reference number 540, the first quarter pitch graded index fiber segment and the second quarter pitch graded index fiber segment index fiber segment may be tapered (e.g., reducing the diameters and increasing the lengths of the graded index fiber segments), and the output of the high-power all-fiber telescope may be actively monitored while the graded index fiber segments are tapered until the optimum image quality is achieved.

As indicated above, FIGS. 5A-5B are provided as examples. Other examples may differ from what is described with regard to FIGS. 5A-5B.

Figure 6:
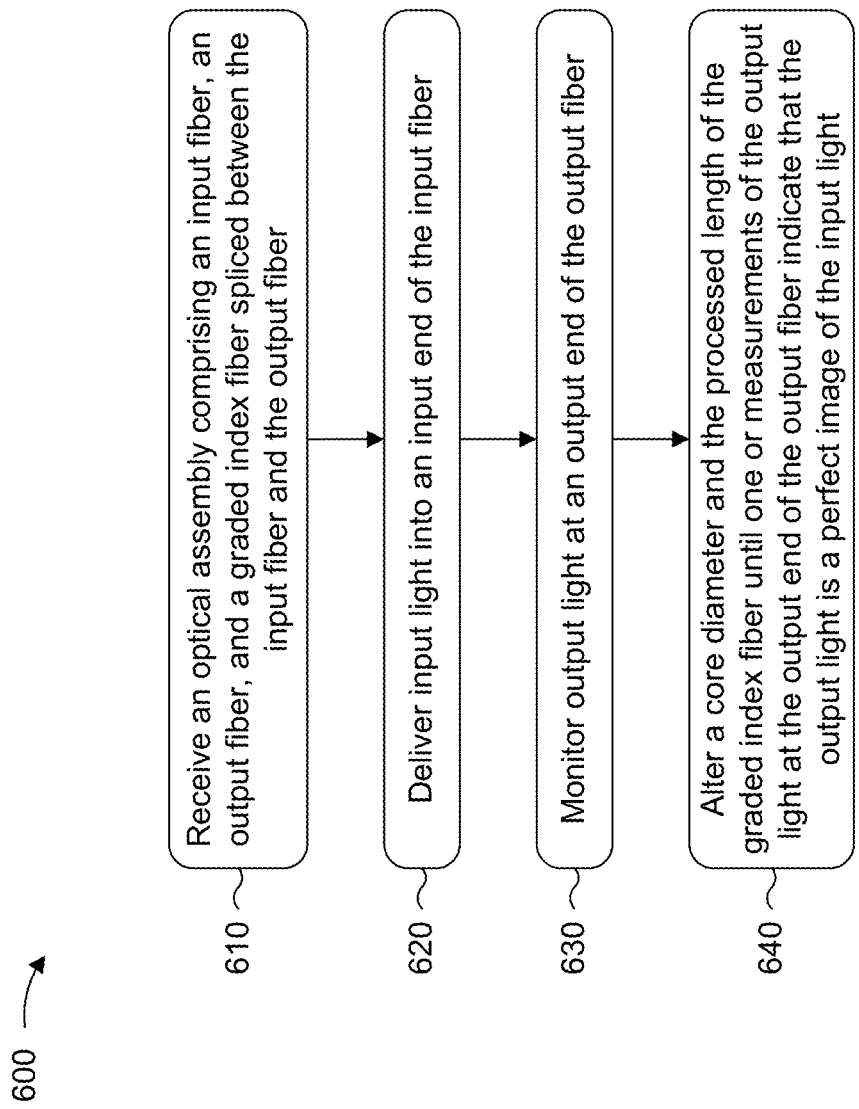
FIG. 6 is a flowchart of an example process for optimizing a length of a graded index fiber to improve image quality.

FIG. 6 is a flowchart of an example process 600 associated with for optimizing graded index fiber length to improve image quality. In some implementations, one or more process blocks of FIG. 6 are performed by a fiber processing machine. In some implementations, one or more process blocks of FIG. 6 are performed by another device or a group of devices separate from or including the fiber processing machine.

As shown in FIG. 6, process 600 may include receiving an optical assembly comprising an input fiber, an output fiber, and a graded index fiber spliced between the input fiber and the output fiber (block 610). For example, the fiber processing machine may receive an optical assembly comprising an input fiber, an output fiber, and a graded index fiber spliced between the input fiber and the output fiber, as described above. In some implementations, the graded index fiber has a pitch length and a processed length, where the processed length may be shorter than the pitch length or longer than the pitch length.

As further shown in FIG. 6, process 600 may include delivering input light into an input end of the input fiber (block 620). As further shown in FIG. 6, process 600 may include monitoring output light at an output end of the output fiber (block 630).

As further shown in FIG. 6, process 600 may include altering a core diameter and the processed length of the graded index fiber until one or more measurements of the output light at the output end of the output fiber indicate that the output light is a perfect image of the input light (block 640). For example, the fiber processing machine may alter a core diameter and the processed length of the graded index fiber until one or more measurements of the output light at the output end of the output fiber indicate that the output light is a perfect image of the input light, as described above. In some implementations, the processed length of the graded index fiber is N times the pitch length when the one or more measurements indicate that the output light is a perfect image of the input light, where N is an integer, a half-integer, or a quarter-integer.

Process 600 may include additional implementations, such as any single implementation or any combination of implementations described below and/or in connection with one or more other processes described elsewhere herein.

In a first implementation, altering the core diameter and the processed length of the graded index fiber comprises reducing the core diameter and increasing the processed length of the graded index fiber.

In a second implementation, altering the core diameter and the processed length of the graded index fiber comprises expanding the core diameter and shortening the processed length of the graded index fiber.

In a third implementation, alone or in combination with the first implementation and/or the second implementation, the core diameter and the processed length of the graded index fiber are altered independently from one another.

In a fourth implementation, alone or in combination with one or more of the first through third implementations, the one or more measurements of the output light are monitored in a near field.

In a fifth implementation, alone or in combination with one or more of the first through fourth implementations, the one or more measurements of the output light are monitored in a far field.

In a sixth implementation, alone or in combination with one or more of the first through fifth implementations, the one or more measurements are based on an output power from a core of the output fiber and an output power from a cladding of the output fiber.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When a component or one or more components (e.g., a laser emitter or one or more laser emitters) is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for manufacturing a graded index fiber, comprising:
   receiving an optical assembly comprising an input fiber, an output fiber, and a graded index fiber spliced between the input fiber and the output fiber,
      wherein the graded index fiber has a pitch length and a processed length;
   delivering input light into an input end of the input fiber;
   monitoring output light at an output end of the output fiber, wherein the monitoring comprises actively monitoring the output light; and
   tapering the graded index fiber while actively monitoring the output light until one or more measurements of the output light at the output end of the output fiber indicate that the output light is a perfect image of the input light,
      wherein the processed length of the graded index fiber is N times the pitch length when the one or more measurements indicate that the output light is a perfect image of the input light, where N is an integer, a half-integer, or a quarter-integer.

2. The method of claim 1,
   wherein tapering the graded index fiber comprises increasing the processed length of the graded index fiber.

3. The method of claim 1,
   wherein tapering the graded index fiber comprises reducing a core diameter of the graded index fiber.

4. The method of claim 3,
   wherein reducing the core diameter of the graded index fiber causes the pitch length to be reduced.

5. The method of claim 1,
   wherein tapering the graded index fiber comprises increasing the processed length of the graded index fiber and reducing a core diameter of the graded index fiber.

6. The method of claim 1,
   wherein the one or more measurements of the output light are monitored in a near field.

7. The method of claim 1,
   wherein the one or more measurements of the output light are monitored in a far field.

8. The method of claim 1,
   wherein the one or more measurements are based on an output power from a core of the output fiber and an output power from a cladding of the output fiber.

9. A method for manufacturing a graded index fiber, comprising:
   receiving an optical assembly comprising an input fiber, an output fiber, and a graded index fiber spliced between the input fiber and the output fiber,
      wherein the graded index fiber has a pitch length and a processed length;
   delivering input light into an input end of the input fiber;
   monitoring output light at an output end of the output fiber, wherein the monitoring comprises actively monitoring the output light; and
   expanding a core diameter of the graded index fiber while shortening the processed length of the graded index fiber and actively monitoring the output light until one or more measurements of the output light at the output end of the output fiber indicate that the output light is a perfect image of the input light,
      wherein the processed length of the graded index fiber is N times the pitch length when the one or more measurements indicate that the output light is a perfect image of the input light, where N is an integer, a half-integer, or a quarter-integer.

10. The method of claim 9,
wherein the core diameter and the processed length of the graded index fiber are altered independently from one another.

11. The method of claim 9,
wherein the one or more measurements of the output light are monitored in a near field.

12. The method of claim 9,
wherein the one or more measurements of the output light are monitored in a far field.

13. The method of claim 9,
wherein the one or more measurements are based on an output power from a core of the output fiber and an output power from a cladding of the output fiber.

14. A method for manufacturing a graded index fiber, comprising:
receiving an optical assembly comprising an input fiber, an output fiber, and a graded index fiber spliced between the input fiber and the output fiber,
wherein the graded index fiber has a pitch length and a processed length;
delivering input light into an input end of the input fiber;
monitoring output light at an output end of the output fiber, wherein the monitoring comprises actively monitoring the output light; and
altering a core diameter and the processed length of the graded index fiber while actively monitoring the output light until one or more measurements of the output light at the output end of the output fiber indicate that the output light is a perfect image of the input light,
wherein the processed length of the graded index fiber is N times the pitch length when the one or more measurements indicate that the output light is a perfect image of the input light, where N is an integer, a half-integer, or a quarter-integer.

15. The method of claim 14,
wherein altering the core diameter and the processed length of the graded index fiber comprises reducing the core diameter and increasing the processed length of the graded index fiber.

16. The method of claim 14,
wherein altering the core diameter and the processed length of the graded index fiber comprises expanding the core diameter and shortening the processed length of the graded index fiber.

17. The method of claim 14,
wherein the core diameter and the processed length of the graded index fiber are altered independently from one another.

18. The method of claim 14,
wherein the one or more measurements of the output light are monitored in a near field.

19. The method of claim 14,
wherein the one or more measurements of the output light are monitored in a far field.

20. The method of claim 14,
wherein the one or more measurements are based on an output power from a core of the output fiber and an output power from a cladding of the output fiber.

* * * * *